United States Patent Office 3,559,296
Patented Feb. 2, 1971

3,559,296
PROCESS FOR THE REGENERATION OF HYDROCARBON ADSORBENTS
Heinrich Dratwa, Rheinhausen, Gunter Gappa, Gelsenkirchen-Buer, and Harald Juntgen, Martin Kruel, and Jurgen Schwarte, Essen, Germany, assignors to Bergwerksverband G.m.b.H., Essen, Germany
No Drawing. Filed Mar. 4, 1969, Ser. No. 804,284
Claims priority, application Germany, Mar. 5, 1968,
P 17 19 554.9
Int. Cl. F26b 3/00
U.S. Cl. 34—9          12 Claims

ABSTRACT OF THE DISCLOSURE

Granular or shaped hydrocarbon adsorbents are regenerated by subjecting the adsorbent to a heat treatment in contact with a hot solid heat exchanger.

BACKGROUND OF THE INVENTION

The invention relates to the regeneration of adsorbents in granular or shaped form. More specifically, it relates to the regeneration of hydrocarbon adsorbents, which are charged with adsorbed substance such as $SO_2$, by means of a thermal treatment.

The regeneration of charged hydrocarbon adsorbents by means of an indirect or direct heat treatment is known. The direct heat treatment with hot gases or vapors, in particular water vapor, has usually been the preferred treatment because of the better heat exchange mechanism.

This process, however, has the shortcoming that whenever the regeneration requires the use of higher temperatures, the water vapor will react with the hydrocarbon adsorbent and will start a hydrogen reaction. This results in increasing loss of material and in a reduction of the hardness of the adsorbents.

The use of different types of hot gases, for instance flue gases, likewise involves the possibility of a chemical reaction of the carbon dioxide, oxygen and water vapor contained in the gases with the hydrocarbon adsorbent.

The invention has therefore the object to provide for a regeneration process which can be carried out with hydrocarbon adsorbents that may be charged with different materials, particularly $SO_2$, wherein the regeneration can be carried out without involving secondary reactions. A further object is a regeneration process of this type which accomplishes a high degree of regeneration in a comparatively short period of time.

SUMMARY OF THE INVENTION

These objects are met by a regeneration process for granular or shaped hydrocarbon adsorbents wherein the adsorbent is subjected to a heat treatment by bringing it in contact with a hot solid heat exchanger. Preferably, the heat exchanger is sand.

DESCRIPTION OF THE PREFERRED EMBODIMENTS

The preferred heat exchanger in the regeneration process of the invention is sand, and particularly quartz sand. The sand should have a fine grain size, that is the grain size should be below 1 mm. preferably. The use of hot sand instead of hot gases for the direct heat treatment of charged hydrocarbon adsorbents thus presents many advantages.

It is in particular possible to get along with comparatively small regeneration vessels since the heat capacity relative to the volume is considerably higher in case of solid heat exchangers than in case of gases or vapors.

The apparatus employed to reheat the sand likewise can be of smaller size because the reheating will proceed at a more rapid rate in view of the small grain size of the sand.

The use of sand also results in a rapid heat exchange from the sand to the adsorbent that is to be regenerated. This excellent heat exchange mechanism leads to a fast and complete desorption and thus to a rapid discharge of the gaseous products which devolve during the regeneration out of the desorption vessel. This in turn helps to forestall a chemical reaction between the hot desorption gases, such as $SO_2/SO_3$ and the adsorbent. At least the amount of such reactions is substantially reduced. The use of sand as heat exchanger also permits to reach very high regenerating temperatures, such as up to about 1000° C., should such be desired, without much effort and without much loss of time.

An additional advantage is that with the regeneration of the invention the loss due to abrasion of the hydrocarbon adsorbent is extremely small.

The process of the invention is particularly suitable for adsorbents of a granular or shaped structure with a grain size above 2 mm. All types of hydrocarbon adsorbents may be used, such as various kinds of coke or active carbon. Suitable are also hard shaped products formed by extrusion or pelleting from finely ground hydrocarbon starting products such as charcoal, peat coke, lignite or air-oxidized mineral coal.

Surprisingly, it has been found that in case of the regeneration of the shaped products with solid heat exchangers, the loss by abrasion is very small and below 0.1% per regeneration run.

A wide variety of charges can be handled in the process of the invention. Thus, the hydrocarbon adsorbents may be charged with inorganic or also organic substances, for instance sulfuric acid, hydrocarbons, in particular higher hydrocarbons, or elemental sulfur.

The regeneration temperature should be selected depending on the charge in the adsorbent. It may vary for instance between 100 and 1000° C. For instance, for the desorption of hydrocarbons temperatures are necessary somewhat above 90° C. For the desorption of sulfuric acid, the temperatures should be about 300–500° C. and for elemental sulfur between 500 and 700° C.

In general, the treating time may be 50 to 30 minutes and the amount e.g. of sand relation to the adsorbent such as coke may be from 5 to 25:1. Other useful heat exchanges are corundum sand, zirconium sand, coke fines and iron ore sand, etc.

It will be understood that the heat exchanger must always be heated to a higher temperature before it is brought into contact with the adsorbent to be regenerated. Thus, in case of sulfuric acid, the heat exchanger must be heated to a temperature above 300° C. In case of hydrocarbons, the temperature of the heat exchanger must be above 90° C. and for sulfur it must be above 500° C., preferably between 600 and 800° C.[1]

The following examples will further illustrate the invention.

EXAMPLE 1

An adsorbent in the form of an active coke having shapes with a diameter of 9 mm. which was charged with 15% by volume of sulfuric acid was passed in a continuous process in a vessel at a ratio of 100 kg. per hour. Mixed with the coke in this operation was a quartz sand of a grain size of about 1 mm. which had been heated to 400° C. The sand was used in an amount of 600 kg. per hour.

---
[1] In case of higher hydrocarbons, and possibly also in case of other charges, the heat treatment may be carried out at pressures ranging from 5 to 50 atm.

The mixture was passed through the desorption vessel in a movement downwards and was continuously discharged after a dwell time of 10 minutes. The desorption gas, which was generated in the process consisting of $SO_2$, $H_2O$ and $CO_2$, was at the same time continuously withdrawn from the top of the vessel.

After discharge the hot regenerated adsorption coke which still had a temeprature of about 350° C. was separated from the sand by filtration and, after cooling with an inert gas, was recirculated into the adsorption vessel.

The separated sand was passed by a pneumatic feed system to the head of the regeneration vessel and was reheated to 400° C. by means of hot flue gases and was then reintroduced into the vessel.

The adsorption and desorption of $SO_2$ was carried out 12 times in succession with one and the same coke. After that, the activity of the adsorbent was still about 70% of the initial activity.

EXAMPLE 2

Natural gas at a temperature of 50° C. was passed through an adsorption vessel which was filled with active carbon of a 4 mm. size. The throughput was 5 kg. of active carbon per hour. At the inlet there was a pressure of 10 atm. which was the pressure of introduction of the gas.

The natural gas discharged from the adsorption vessel was entirely free of water vapor and contained only such small amount of residual higher hydrocarbons that, in passing on, all natural gas retrograde condensation was avoided.

The active carbon which was charged with the hydrocarbon material was then mixed with coke fines of a grain size below 1 mm. which had been heated to 200° C. The mixture was then passed into a desorption vessel. The residence time of the mixture in the vessel was 7 minutes. The hydrocarbon materials of a $C_2$–$C_5$ structure which had been adsorbed by the active carbon were released in gaseous form in the desorption vessel and subsequently condensed. The active carbon which was discharged from the desorption vessel was recirculated into the adsorption vessel after separation from the sand.

EXAMPLE 3

Active carbon which had been charged by adsorption of elemental sulfur was passed into a desorption vessel at a rate of 12 kg. per hour. Simultaneously corundum sand was mixed with the carbon which sand had a grain size of below 1 mm. and had been heated to a temperature of 630° C. The amount of sand employed was, relative to the active carbon, at a ratio of 4.75:1. The residence time of the mixture in the desorption vessel was 12 minutes.

The sulfur which formed in the distillation was discharged from the desorption vessel and condensed. After treatment with the hot sand the activity of the active carbon was still about 75% of the initial activity.

What we claim is:

1. A process for the regeneration of granular or shaped hydrocarbon adsorbents charged with an adsorbed substance, the said process comprising subjecting the adsorbent to a heat treatment by bringing it in contact with a hot, solid heat exchanger, the temperature of the heat exchanger and the time of contact being sufficient to cause the adsorbed substance to be released from the adsorbent.

2. The process of claim 1, wherein the heat exchanger is sand.

3. The process of claim 1, wherein the heat exchanger is quartz sand.

4. The process of claim 1, wherein the heat exchanger is in the form of particles of a size below 1 mm.

5. The process of claim 4, wherein the adsorbent has a grain size above 2 mm.

6. The process of claim 1, wherein the treatment is carrier out at a temperature between 100 and 1000° C.

7. The process of claim 1, wherein the adsorbent is active coke charged with $H_2SO_4$ and wherein the heat exchanger is heated to a temperature above 300° C.

8. The process of claim 1, wherein the adsorbent is active carbon charged with higher hydrocarbons and where in the heat exchanger is heated to a temperature above 90° C. and the regeneration is carried out at an elevated pressure.

9. The process of claim 1, wherein the adsorbent is active coke charged with elemental sulfur and wherein the heat exchanger is heated to a temperature above 500° C.

10. The process of claim 9, wherein the heat exchanger is heated to a temperature between 600 and 800° C.

11. The process of claim 1, wherein the adsorbent is selected from the group consisting of active charcoal, active peat coke, active lignite and active air-oxidized mineral coal.

12. The process of claim 1, wherein the heat exchanger is selected from the group consisting of corundum sand, zirconium sand, coke fines and iron ore sands.

References Cited

UNITED STATES PATENTS

| | | | |
|---|---|---|---|
| 916,448 | 3/1909 | Jessup | 34—9 |
| 3,261,463 | 7/1966 | Eveson et al. | 34—9X |

JOHN J. CAMBY, Primary Examiner